United States Patent [19]

Sialino et al.

[11] 4,238,457

[45] Dec. 9, 1980

[54] PROCESS FOR THE RECOVERY OF URANIUM FROM WET-PROCESS PHOSPHORIC ACID

[75] Inventors: Angelo Sialino, Ris Organis; Alain Francois, Toulouse, both of France

[73] Assignees: Compagnie Generale des Matieres Nucleaires (COGEMA) S.A., Paris; APC - Azote et Produits Chimiques S.A., Toulouse, both of France

[21] Appl. No.: 922,019

[22] Filed: Jul. 5, 1978

[30] Foreign Application Priority Data

Jul. 5, 1977 [FR] France .................. 77 20552

[51] Int. Cl.³ .............................. B01D 11/00
[52] U.S. Cl. ............................. 423/10; 423/11
[58] Field of Search ........................ 423/10, 11

[56] References Cited

U.S. PATENT DOCUMENTS

| | | | |
|---|---|---|---|
| 2,859,094 | 11/1958 | Schmitt et al. | 423/10 |
| 3,711,591 | 1/1973 | Hurst et al. | 423/10 |

OTHER PUBLICATIONS

Hurst et al., "Solvent Extraction of Uranium from Wet-Process Phosphoric Acid," ORNL-TM 2522, (Apr. 1969), pp. 24-29.

*Primary Examiner*—Deborah L. Kyle
*Attorney, Agent, or Firm*—Millen & White

[57] ABSTRACT

In a process for the recovery of uranium from a wet-process phosphoric acid, comprising treating in an extraction step the preliminarily oxidized acid first with an organic solvent consisting essentially of a dialkylphosphoric acid and a trialkyphosphine oxide dissolved in an inert and unreactive organic solvent whereby there are obtained a uranium-free phosphoric acid and an organic extract consisting essentially of the solvent containing the major portion of uranium; then, in a reextraction step, separating the uranium from the organic extract as ammonium uranyl tricarbonate by reacting the organic extract with ammonium hydroxide and ammonium carbonate; and recycling the uranium-free solvent to the extraction step; an improvement comprises treating the organic extract in a reextraction apparatus having at least two stages, by (a) introducing the extract at the head of the first stage; (b) countercurrently introducing ammonia or ammonium hydroxide solution at the bottom of the first stage; the pH of the first stage being controlled and maintained at a value of 8.0 to 8.5; (c) introducing an ammonium carbonate aqueous solution at the bottom of the last stage; the amount of ammonium carbonate employed being 50-80 percent by weight of the theoretical molar quantity which is necessary to neutralize the dialkylphosphoric acid contained in the solvent and to convert the uranium to ammonium uranyl tricarbonate; and (d) regenerating the ammoniated solvent obtained after the reextraction step by treating it with an acid before recycling it to the extraction step.

17 Claims, 2 Drawing Figures

PROCESS FOR THE RECOVERY OF URANIUM FROM WET-PROCESS PHOSPHORIC ACID

BACKGROUND OF THE INVENTION

The present invention relates to a process for the recovery of uranium from wet-process phosphoric acid.

The wet-process phosphoric acid is the acid produced by contacting phosphate-containing rock with sulfuric acid and separating the calcium sulfate precipitated.

Natural phosphate rock generally contains from 0.01 to 0.02 weight percent of uranium. During the treatment with sulfuric acid, the major portion of the uranium is dissolved in the phosphoric acid. In spite of the concentrations of uranium contained in such phosphoric acid, it is feasible to recover this uranium owing to the large amounts of phosphoric acid manufactured in the world.

It is already known to recover the uranium contained in phosphoric acid by using a solvent. U.S. Pat. No. 2,859,094 whose disclosure is incorporated by reference herein, describes the use of a solvent mixture consisting of a dialkylphosphoric acid, in particular di(2-ethylhexyl) phosphoric acid, and of a trialkylphosphine oxide, in particular trioctylphosphine oxide. This mixture is dissolved in an inert organic solvent immiscible with water, such as benzene, n-heptane, n-octane, and preferably a mixture of hydrocarbons such as kerosene. In the process of recovering uranium values from phosphoric acid, the uranium is first oxidized to convert it to the +6 oxidation state. Then the phosphoric acid is contacted with the mixed solvent to obtain an aqueous phase consisting of essentially uranium-free phosphoric acid and an organic phase consisting of the solvent containing the major portion of uranium.

A process for the reextraction of the uranium from this solvent is described in ORNL-TM 2522 of April 1969 by F. J. Hurst, Oak Ridge National Laboratory, whose disclosure is incorporated by reference herein. According to this process, the uranium-containing organic solution is contacted with an aqueous ammonium hydroxide solution and with an ammonium carbonate solution. Most of the ammonium hydroxide solution is preferably fed to the first reextraction stage and most of the ammonium carbonate solution to the last stage of a countercurrent system. In other words, uranium is transferred to the aqueous phase where it forms a solution of ammonium uranyl tricarbonate. Simultaneously, iron extracted with the uranium precipitates in the aqueous phase as ferric hydroxide.

The process described in report ORNL-TM 2522 of F. J. Hurst has numerous drawbacks. The organic solvent, essentially freed of uranium by the reextraction process, contains, at equilibrium with the uranium-containing aqueous phase, an appreciable amount of ammonia and also an amount of water which is larger than the amount of water contained in the organic solvent used to extract the uranium from the phosphoric acid, which solvent also contains no ammonia. Thus, when this ammonia-containing organic solvent is recycled to the uranium extraction stage, the uranium-free phosphoric acid which is obtained, is contaminated by large amounts of ammonium ions which most often interfere in using phosphoric acid in further applications. Moreover, in the presence of the phosphoric acid in this step, the solvent yields its water and the obtained uranium-free acid is diluted. It is therefore necessary to reconcentrate it. Furthermore, by using this prior art process, it is not possible to recover the uranium in yields higher than 88 percent by weight.

SUMMARY OF THE INVENTION

Accordingly, it is an object of the present invention to overcome the disadvantages of this prior art process by avoiding the dilution of the phosphoric acid and its contamination by ammonium ions, and by improving the over-all yield of uranium recovery and valorizing the ammonium ions as commercial ammonium phosphate.

Upon further study of the specification and appended claims, further objects and advantages of this invention will become apparent to those skilled in the art.

These and other objects have been attained by providing in a process for the recovery of uranium values from wet-process phosphoric acid which comprises treating the preliminarily oxidized acid with an organic solvent consisting essentially of a dialkylphosphoric acid, in particular the di(2-ethylhexyl) phosphoric acid, and a trialkyphosphine oxide, in particular trioctylphosphine oxide, dissolved in an inert and unreactive organic solvent in order to obtain uranium-free phosphoric acid and an organic extract consisting essentially of the solvent containing the major portion of uranium; separating the uranium from the extract as ammonium uranyl tricarbonate by reacting it with ammonium hydroxide and ammonium carbonate; and recycling the uranium-free solvent to the extraction step; an improvement which comprises treating the uranium extract in a reextraction apparatus having at least two stages, preferably three stages, by introducing the extract at the head of the first stage, countercurrently introducing ammonia gas or ammonium hydroxide solution at the bottom of the first stage, the pH of the first stage being controlled in order to maintain it at a value in the range of 8.0 to 8.5, and introducing an ammonium carbonate aqueous solution at the bottom of the last stage, wherein the amount of ammonium carbonate used is equal to 50 to 80 percent by weight of the theoretical molar quantity which is necessary to neutralize the dialkylphosphoric acid contained in the solvent and to convert the uranium to ammonium uranyl tricarbonate, and regenerating the ammoniated solvent obtained after the reextraction step by treatment with an acid before recycling to the extraction step.

When operating under the conditions defined above, the uranium recovery from the acid is equal to at least 95 percent and the uranium-free phosphoric acid obtained is neither diluted nor contaminated by ammonium ions.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
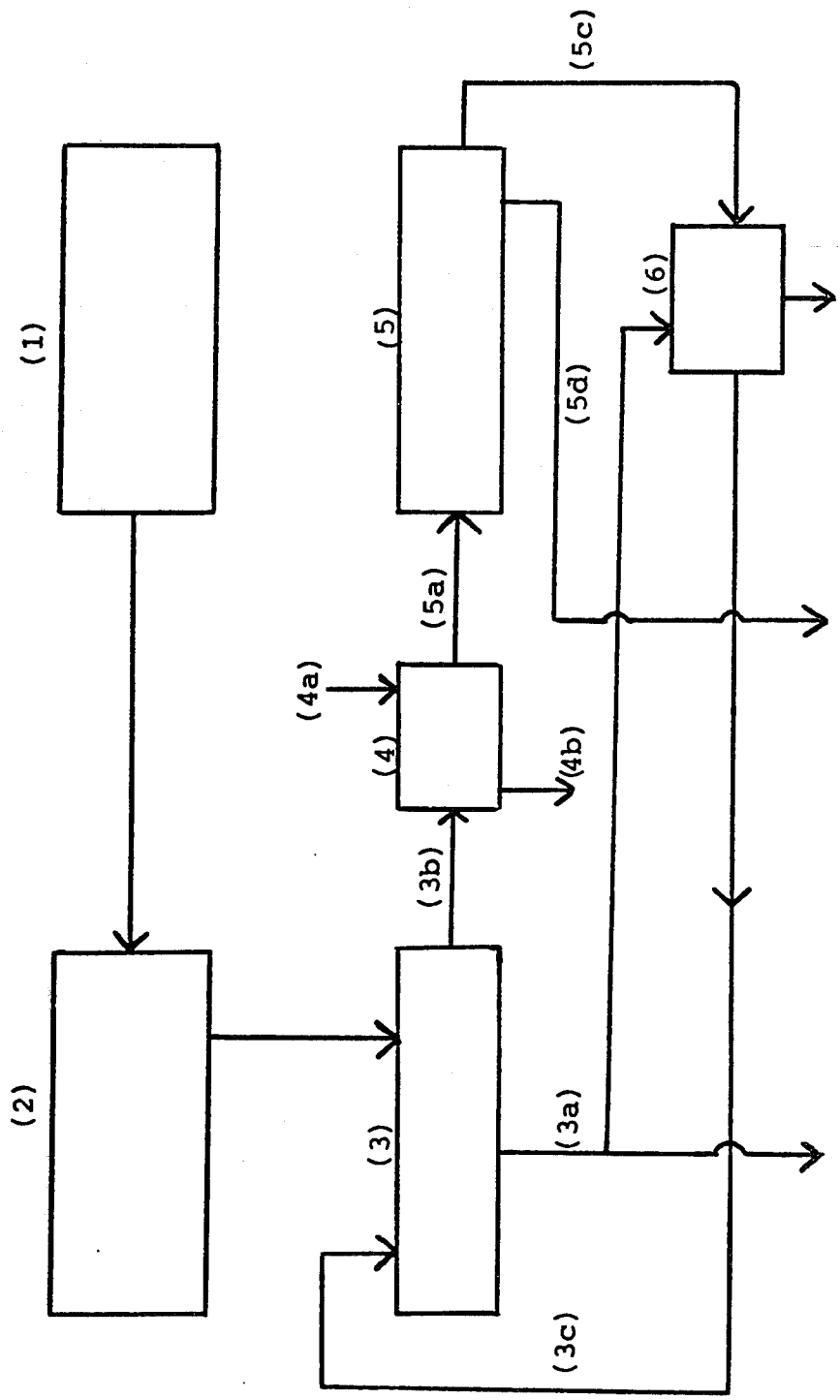
FIG. 1 schematically illustrates the overall operation of a process of this invention.

Unless specified otherwise herein, all operating conditions, parameters and other features of the process of the present invention are conventional, as disclosed, e.g., in U.S. Pat. No. 2,859,094 or ORNL-TM 2522.

According to the process of the present invention the reextraction of uranium from the organic extract is performed in an apparatus having at least two stages. The use of at least two stages is necessary in order to separately introduce ammonium hydroxide and ammonium carbonate solution. Tests have shown that when the two reagents are added in the same stage it is not possible to obtain a good separation of the iron which is coextracted with uranium or with solvent.

Preferably, three stages are used in order to obtain a good regulation of the whole apparatus, in particular of the volume flows. In the first stage, the organic extract containing uranium is introduced at the head and the ammonia or ammonium hydroxide solution is introduced at the bottom in countercurrent flow. The aqueous phase loaded with uranium is drawn off from this first stage. In this first stage, the ferric hydroxide precipitate is separated by decantation. Thus, it is possible to draw it off in continuous or discontinuous fashion. In the latter case, the precipitate of ferric hydroxide is filtered off and the aqueous solution obtained is recycled after the filtration into the first stage of the reextraction apparatus. Ammonium carbonate is introduced into the third stage countercurrently with the organic phase output flow from the previous stage, and the uranium-free organic phase is drawn off from this third stage. When a reextraction apparatus having more than three stages is used, it is more difficult to separate the precipitate of ferric hydroxide from the aqueous phase containing ammonium uranyl tricarbonate.

In the first stage, ammonia or ammonium hydroxide solution is introduced such that the pH is maintained at a value of 8 to 8.5. It has been found that when the pH is lower than 8, the overall uranium reextraction yield decreases. It has been noted that under such a condition, the reextraction unit is unbalanced: the uranium in the aqueous phase of the second stage becomes concentrated while the uranium concentration of the aqueous phase at the outlet of the first stage decreases. For example, when injecting ammonium hydroxide solution in an amount such that the pH is 7.5 and the starting material organic extract is loaded with 0.24 g/l of uranium concentration in the aqueous phase of the second stage is about 500 times as great as the concentration of the aqueous phase of the first stage, the latter being only 0.014 g/l of uranium instead of 3.2 g/l. when operating at pH's exceeding 8.5, the amount of ammonium hydroxide used increases without noticeable improvement in the overall uranium reextraction yield. Moreover, formation of emulsions which make separation of phases difficult and even impossible have been observed. The $NH_4OH$ solution has a molar concentration of 6 M-8 M, preferably 6.5-7.5 M.

The aqueous ammonium carbonate solution is introduced into the third stage of the reextraction apparatus in countercurrent flow with the organic phase output of the preceding stage, preferably a second stage. The amount of ammonium carbonate employed is calculated so that the total amount of ammonium ions introduced as the carbonate corresponds to 50 to 80 percent, by weight of the stoichiometric amount necessary to neutralize the dialkylphosphoric acid contained in the solvent and to recover the uranium as ammonium uranyl tricarbonate. When using amounts of ammonium carbonate exceeding 80% by weight of the stoichiometrically required amount, the pH of the resultant solution is too high and the problems are the same as those described hereinabove when operating at $pH > 8.5$. When using amounts of ammonium carbonate lower than 50 percent by weight of the stoichiometric amount, it has also been noted that the reextraction unit becomes unbalanced, meaning that the uranium concentration of the aqueous phase of the first stage is lessened.

The inputs to the second stage are the organic phase output flow from the first stage and the aqueous phase output flow from the third stage. These input streams are introduced in countercurrent relationship.

According to the present invention, the ammoniated solvent flowing out of the reextraction apparatus is regenerated by treatment with an acid. The acid used may be sulfuric acid or hydrochloric acid, but a fraction of the uranium-free phosphoric acid emanating from the extraction step is preferably used. In the latter case, 1 to 10 percent by volume of uranium-free phosphoric acid is added to the ammoniated solvent. Generally, from 2 to 8 percent by volume of acid of concentration at most equal to 35 percent by weight is added to the ammoniated solvent. After the regeneration step, the organic phase has essentially the same composition as the original extraction solvent, and contains substantially no ammonium ions. Moreover, in this step it gives up its excess water content so that after regeneration it has essentially its initial amount of water. This organic phase, separated from the aqueous phase which contains an ammonium salt, is then recycled as the solvent for the extraction step.

The following description is intended to illustrate the process of this invention.

Phosphoric acid, preferably supplied directly from the phosphoric acid production unit, i.e., having a concentration equal to or lower than 35% $P_2O_5$ and which is cleared of suspended solids, is pumped to a storing tank 1, with reference to FIG. 1. Generally, this acid contains from 0.05 to 0.20 g/l of uranium, from 2.0 to 5.6 g/l of iron and at most 2 g/l of calcium.

The acid is then transferred to a tank 2 where it is oxidized, in order that all of the uranium is converted to the hexavalent state (uranyl ion). At the same time iron is converted to its trivalent state (ferric iron). This oxidation is performed according to known methods such as by bubbling of air or addition of chlorate or hydrogen peroxide. Hydrogen peroxide is preferably used because the reaction involved is fast and uses only a small amount of reagent. For instance, 1.8 to 1.9 liters of hydrogen peroxide of concentration equal to 48 percent by weight per cubic meter of phosphoric acid can be used.

The oxidized phosphoric acid goes into the extractor 3 where it is contacted with an organic solvent moving countercurrently to the acid. This solvent consists of a mixture of dialkylphosphoric acid, in particular di(2-ethylhexyl) phosphoric acid, and a trialkylphosphine oxide, in particular trialkylphosphine oxide, this mixture being dissolved in an inert organic solvent immiscible with water such as benzene, n-heptane, n-octane and in particular a mixture of hydrocarbons such as kerosene. The volume ratio of phosphoric acid to organic solvent is preferably between 1 and 10.

The concentration of di(2-ethylhexyl) phosphoric acid in the organic solvent is 0.1–1 mole/liter of solvent and the concentration of tri-n-octyl phosphine oxide is 0.025–0.25 mole/liter.

The extraction is performed countercurrently in a conventional apparatus such as a mixer settler apparatus and at a temperature of 25°–65° C., preferably of about 40° C. The temperature is chosen to minimize the cost of cooling the phosphoric acid which comes out of the phosphoric acid manufacturing plant at about 65° C. The uranium-free phosphoric acid comes out of the extractor 3 through pipe 3a. The greater part of uranium-free phosphoric acid is led to an acidification tank 6.

The solvent loaded with uranium and contaminated with metallic ions, in particular with ferric ions, is introduced to a washing unit 4 through pipe 3b, where phosphoric ions included in the solvent are essentially removed. The washing waters are led to the washing unit through pipe 4a and the waste waters exit through pipe 4b. The washed solvent containing uranium is introduced to the reextraction unit 5 via pipe 5a.

Figure 2:
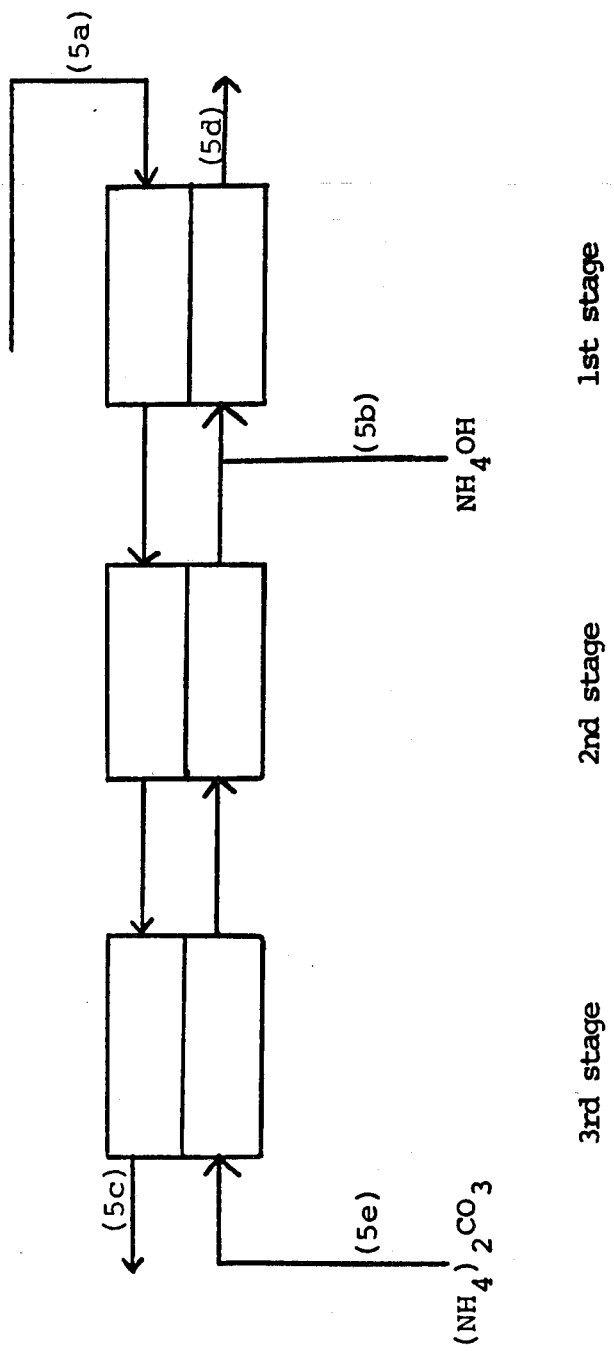
FIG. 2 schematically illustrates the reextraction operation of the process of this invention.

According to the present invention, the reextraction unit, see FIG. 2, preferably has three stages. The temperature during reextraction is 35°–45° C., preferably about 40° C. The solvent containing uranium is introduced in the first stage of the reextraction unit by the pipe 5a. Thereafter, it moves by gravity. An ammonium hydroxide solution or ammonia is also introduced in the first stage. The flow rates of ammonium hydroxide solution or ammonia are regulated by using for instance, a regulating valve which is operated by a pH-meter in order to maintain the pH at a value of 8–8.5. In the last stage of the reextraction apparatus, ammonium carbonate solution or a mixture of carbon dioxide and ammonia preliminarily dissolved in water is introduced in an amount equal to 50 to 80 percent by weight of the theoretical stoichiometric molar quantity (as described hereinabove).

When the reextraction unit is in operation, the solvent containing uranium and iron is gradually transformed into its ammonium hydrated salt by reaction with ammonium hydroxide solution. In the aqueous phase moving countercurrently to the solvent, the concentration of uranium and of iron increases as ammonium carbonate reacts with uranium to give ammonium uranyl tricarbonate which does not precipitate and with iron to give iron hydroxide which precipitates. The iron hydroxide accumulates in the reextraction apparatus where it is separated out from the the aqueous phase by decantation. It is recovered in continuous or discontinuous fashion. The aqueous phase is filtered and recycled to the solution obtained in the reextraction unit. The aqueous phase containing ammonium uranyl tricarbonate exits from the reextraction unit by the pipe 5d.

FIG. 1 illustrates the last steps of the process of the present invention. The uranium-free extraction solvent which goes out from the reextraction unit as an ammonium salt is introduced by pipe 5c into acidification tank 6 where a fraction of the phosphoric acid which comes from the extractor 3 is also introduced. The purified extraction solvent which leaves the acidification tank 6 by the pipe 3c is recycled to the reextraction unit. The ammonium salt of the extraction solvent is decomposed by reaction with phosphoric acid and produces a commercial ammonium phosphate. This obtained ammonium phosphate is separated by any suitable method such as crystallization. The reaction mother liquours are peferably recycled to the acification tank 6.

The aqueous phase containing dissolved ammonium uranyl tricarbonate leaves the reextractor through pipe 5d. Uranium is recovered in conventional fashion, either as its oxide or as sodium uranate according to the particular treatment performed on the ammonium uranyl tricarbonate solution. For instance, uranium trioxide is obtained by treating an ammonium uranyl tricarbonate solution with bubbling air in a reactor at temperatures from 90° to 100° C. for 6 hours. After filtering, washing with water, drying at about 120° C. and calcinating at 400° C., uranium trioxide is obtained.

Sodium uranate is obtained by neutralizing, at about 80° C. with sodium hydroxide, a solution of ammonium uranyl tricarbonate from which gases such as carbon dioxide and ammonia have been previously removed by bubbling with air at 80° C. for one hour. After filtering and washing with water at 50° C., sodium uranate is obtained, which afterwards is converted into ammonium diuranate or uranium trioxide.

Without further elaboration, it is believed that one skilled in the art can, using the preceding description, utilize the present invention to its fullest extent. The following preferred specific embodiments are, therefore, to be construed as merely illustrative, and not limiative of the remainder of the disclosure in any way whatsoever. In the following example all temperatures are set forth uncorrected in degrees Celsius; unless otherwise indicated, all parts and percentages are by weight.

EXAMPLE 2.5m$^3$ of a phosphoric acid solution produced by acidulation of phosphate rock with sulfuric acid and having a temperature of 60° C. are stored in tank 1. This solution contained 345 g/l of $P_2O_5$, 0.06 g/l of uranium and 1.91 g/l of iron.

The phosphoric acid solution (2.5m$^3$) has a temperature of 40° C. in tank 2. It is oxidized with 4.5 liters of hydrogen peroxide of concentration equal to 48 percent by weight so that all of the uranium is oxidized to its hexavalent state, the iron being oxidized to its ferric state. To terminate the oxidation operation, phosphoric acid is agitated for 6 hours.

The so-obtained acidic solution is introduced at 40° C. into the extraction operation 3 at a flow rate equal to 25.6 l/h. The organic solvent used for extraction is introduced in the extractor apparatus through pipe 3c at a flow rate equal to 7.05 l/h. The organic solvent was kerosene which contained 0.5 mole/liter of di(2-ethylhexyl) phosphoric acid and 0.125 mole/liter of trioctylphosphine oxide. The extractor apparatus had 5 stages of mixer-settlers.

The aqueous solution exited from the extractor apparatus through pipe 3a. Its flow rate was 25.6 l/h 0.8 l/h were introduced into the acidification tank 6 in order to regenerate the extraction solvent at the end of the extraction cycle. The organic solvent leaving the extractor 3 through the pipe 3b was introduced in a washing unit composed of two stages of mixer-settlers in order to eliminate impurities, particularly phosphate ions. The washing was carried out countercurrently at 40° C., the flow rate of washing water being equal to 1.3 l/h, and the waste waters going out from the washing unit through pipe 4b. The purified organic solvent loaded with uranyl ions and ferric ions was introduced in the reextractor apparatus 5 through the pipe 5a. It contained 0.27 g/l of uranium and 0.350 g/l of iron.

The reextractor apparatus 5 was constituted by three stages of countercurrent mixer-settlers. FIG. 2 schematically illustrates the working of this unit. The reextraction step was carried out at 40° C. In the mixer of the first stage where the loaded organic solvent was introduced with a flow rate equal to 7.05 l/h, an ammonium hydroxide solution was introduced through the pipe 5b. The amount used was such that the pH was 8.5 in this first stage of the reextraction apparatus. An ammonium hydroxide solution having a concentration of 17 M, at a flow rate equal to 0.22 l/h was used. In the mixer of the third stage of the reextraction apparatus, an ammonium carbonate solution having a concentration of 140 g/l was introduced by pipe 5e at a flow rate of 0.9 l/h. This amount corresponds to 74 percent by weight of the theoretical stoichiometric molar quantity as defined hereinabove. The uranium-free organic solvent exited from the reextraction apparatus 5 with a flow rate equal to 7.6 l/h, containing 0.002 gl of uranium. It was introduced into the acidification mixer 6 through the pipe 5c for regeneration. It was introduced into this mixer with a flow rate of 7.6 l/h and it was treated by a fraction of the acidic solution coming from the extractor 3 through the pipe 3a with a flow rate equal to 0.80 l/h. The regenerated solvent exited from the settler of the acidification stage 6 through the pipe 3c with a flow rate of 7.05 l/h.

An iron hydroxide precipitate was formed in the stages of the reextractor and in particular in the first stage (2.9 kg. of wet precipitate for 2.5 m$^3$ of treated acid). 0.55 l/h of aqueous phase which contained ammonium uranyl tricarbonate (3.55 g/l of uranium) was drawn off from the reextractor 5 through the pipe 5d. Decanted iron hydroxide was drawn off at regular intervals or in a continuous way and then filtered. The clear solution obtained was recycled back into the stage from which it was taken.

This solution of ammonium uranyl tricarbonate which was previously clarified, was maintained at 95° C. in a reactor and bubbled with air for 6 hours. After filtration, washing with water, drying at 120° C. and calcination at 400° C., a uranic concentrated product of uranium trioxide containing 1.42 g of uranium was obtained. This uranic product contained only 0.25 percent by weight of iron based on the weight of uranium. The over-all uranium recovery was equal to 95%.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

We claim

1. In a process for the recovery of uranium from a wet-process phosphoric acid, comprising treating in an extraction step, the preliminary oxidized acid first with an organic solvent consisting essentially of a dialklyphosphoric acid and a trialkylphosphine oxide, dissolved in an inert and unreactive organic solvent whereby there are obtained a uranium-free phosphoric acid and an organic extract consisting essentially of the solvent containing the major portion of uranium; then, in a reextraction step, separating the uranium from the organic extract as ammonium uranyl tricarbonate by reacting the organic extract with ammonium hydroxide and ammonium carbonate; and recycling the uranium-free solvent to the extraction step; the improvement which comprises treating the organic extract in a reextraction apparatus having at least two stages, by (a) introducing the extract at the head of the first stage; (b) countercurrently introducing ammonia or ammonium hydroxide solution at the bottom of the first stage; the pH of the first stage being controlled and maintained at a value of 8.0 to 8.5; (c) introducing an ammonium carbonate aqueous solution at the bottom of the last stage; the amount of ammonium carbonate employed being 50–80 percent by weight of the theoretical molar quantity which is necessary to neutralize the dialkylphosphoric acid contained in the solvent and to convert the uranium to ammonium uranyl tricarbonate; and (d) separately regenerating the ammoniated solvent obtained after the reextraction step by treating it with an acid and recycling regenerated solvent to the extraction step.

2. The process of claim 1 wherein the dialkylphosphoric acid is di(2-ethylhexyl) phosphoric acid and the trialkylphosphine oxide is trioctylphosphine oxide.

3. The process of claim 2, wherein the acid used in the regeneration is a fraction of the uranium-free phosphoric acid exiting from the extraction step.

4. The process of claim 2, wherein the amount of ammonium carbonate employed in the last stage is 71–80% by weight of said theoretical molar quantity.

5. The process of claim 4, wherein the pH in the first stage of the reextraction step is about 8.5.

6. The process of claim 5, wherein in the first stage of the reextraction step, ammonium hydroxide is employed having a concentration of from 6.5 to 7.5 moles per liter.

7. The process of claim 6, wherein the wet-process phosphoric acid contains from 0.05 to 0.20 grams per liter of uranium.

8. The process of claim 2, wherein the wet-process phosphoric acid contains from 0.05 to 0.20 grams per liter of uranium.

9. The process of claim 1 wherein the reextraction step has three stages.

10. The process of claim 1 wherein the ammoniated solvent obtained after reextraction is regenerated by treatment with sulfuric acid, hydrochloric acid or phosphoric acid.

11. The process of claim 1 which further comprises recovering uranium from the solution containing ammonium uranyl tricarbonate by conversion of the tricarbonate to an oxide of uranium or sodium uranate.

12. The process of claim 1, wherein the wet-process phosphoric acid contains from 0.05 to 0.20 grams per liter of uranium.

13. A process for extracting uranium from an organic phase containing uranium, the organic phase consisting essentially of a dialkylphosphoric acid and a trialkylphosphine oxide dissolved in an inert and unreactive organic solvent, which comprises treating the organic phase in a reextraction apparatus having at least two stages, by (a) introducing the organic phase at the head of the first stage; (b) introducing countercurrently ammonia or ammonium hydroxide solution at the bottom of the first stage; the pH of the first stage being controlled and maintained at a value of 8.0 to 8.5; and (c) introducing an ammonium carbonate aqueous solution at the bottom of the last stage; the amount of ammonium carbonate employed being 50–80 percent by weight of the theoretical molar quantity which is necessary to neutralize the dialklyphosphoric acid contained in the solvent and to convert the uranium to ammonium uranyl tricarbonate.

14. The process of claim 13, wherein the dialkylphosphoric acid is di(2-ethylhexyl) phosphoric acid and the trialkylphosphine oxide is trioctylphosphine oxide.

15. The process of claim 14, wherein the amount of ammonium carbonate employed in the last stage is 71–80% by weight of said theoretical molar quantity.

16. The process of claim 15, wherein the pH in the first stage of the reextraction step is about 8.5.

17. The process of claim 16, wherein the first stage of the reextraction step, ammonium hydroxide is employed having a concentration of from 6.5 to 7.5 moles per liter.

* * * * *